UNITED STATES PATENT OFFICE.

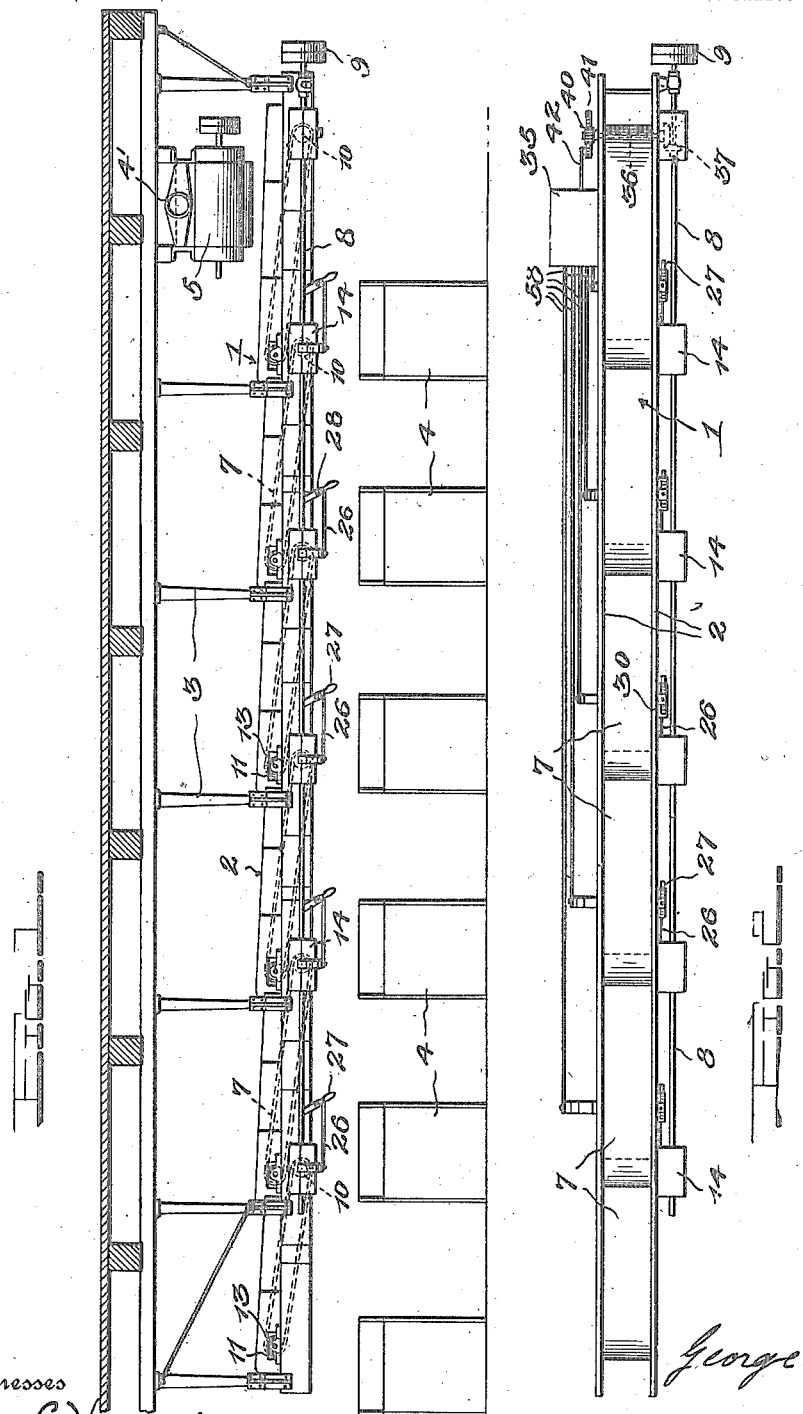

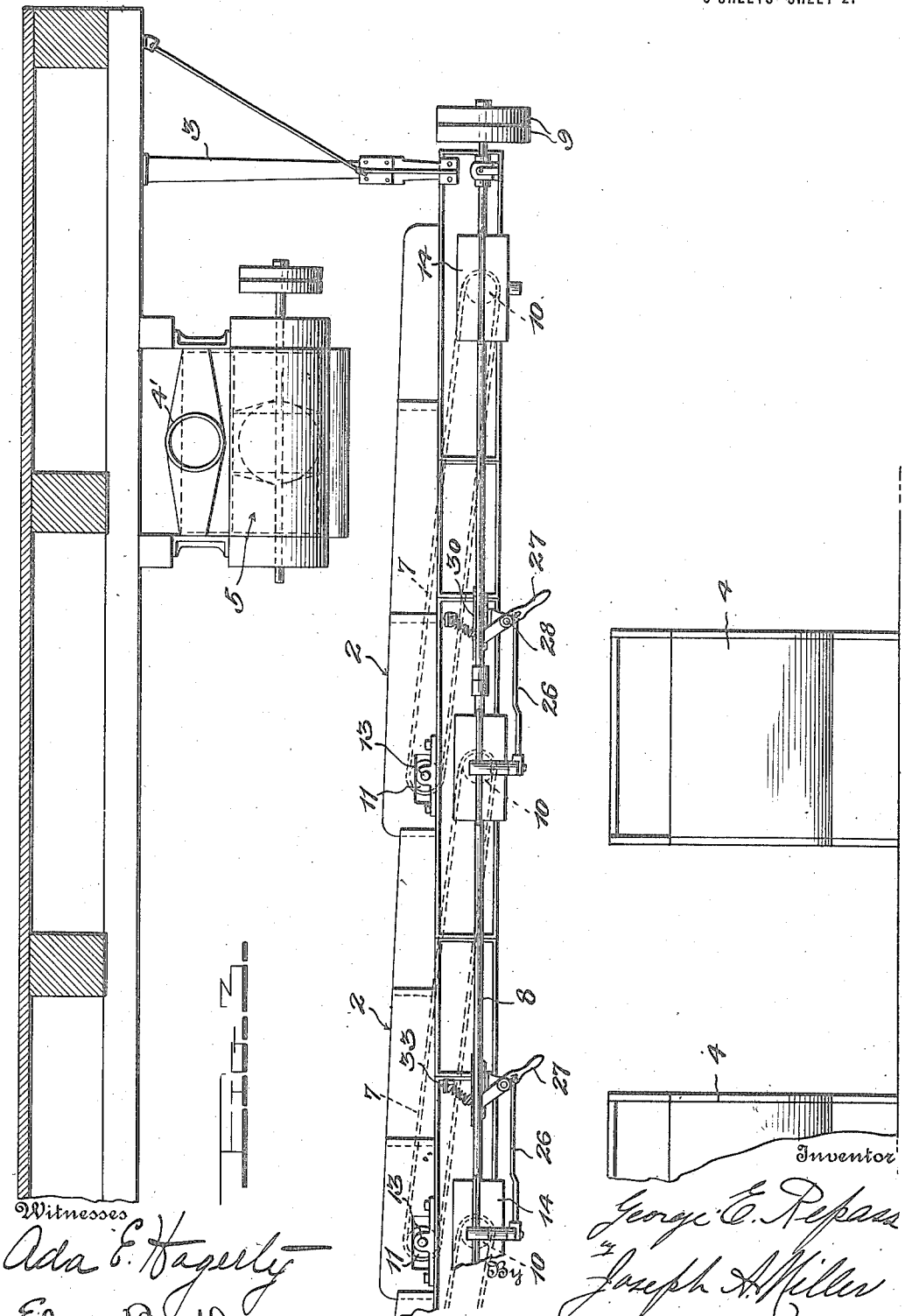

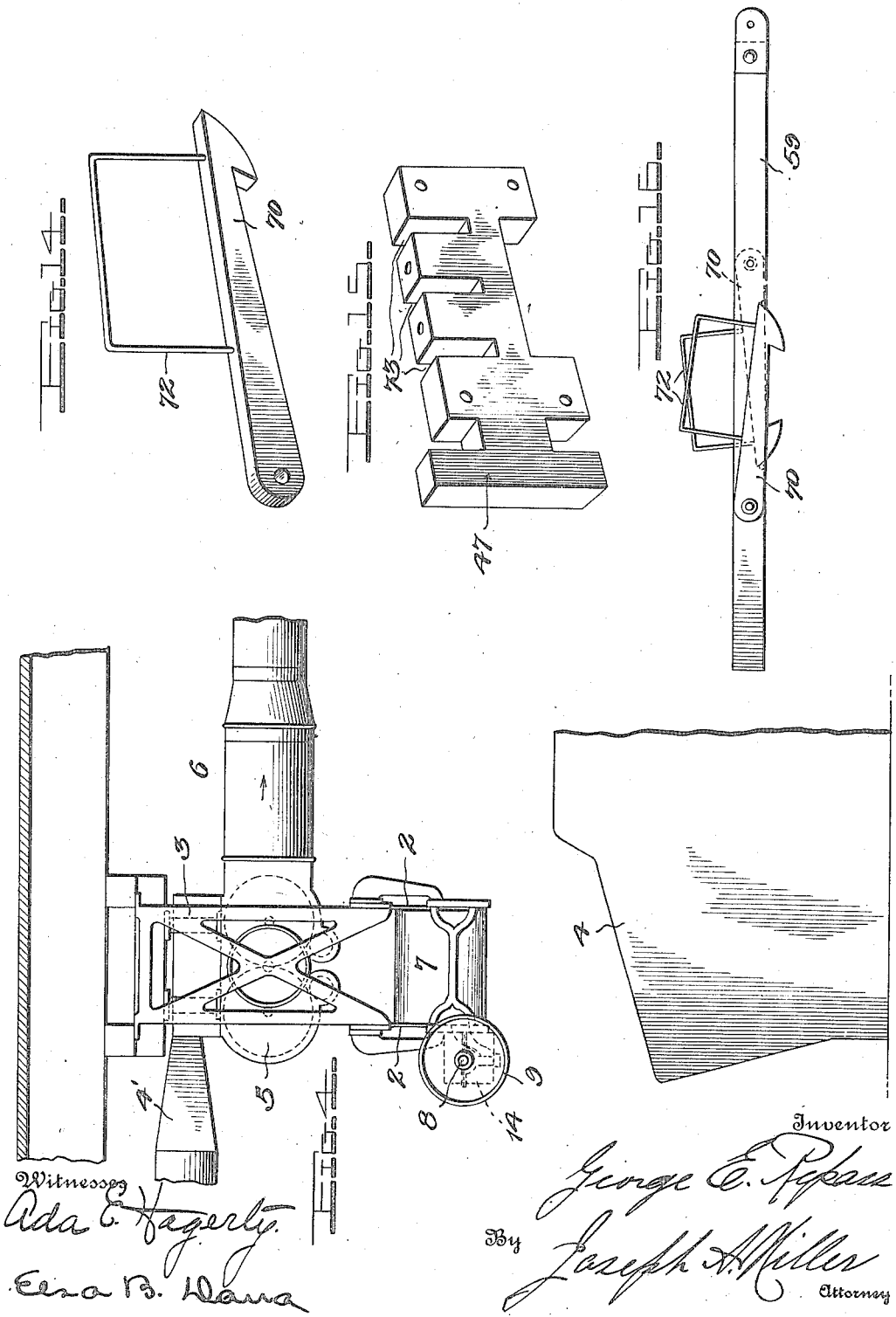

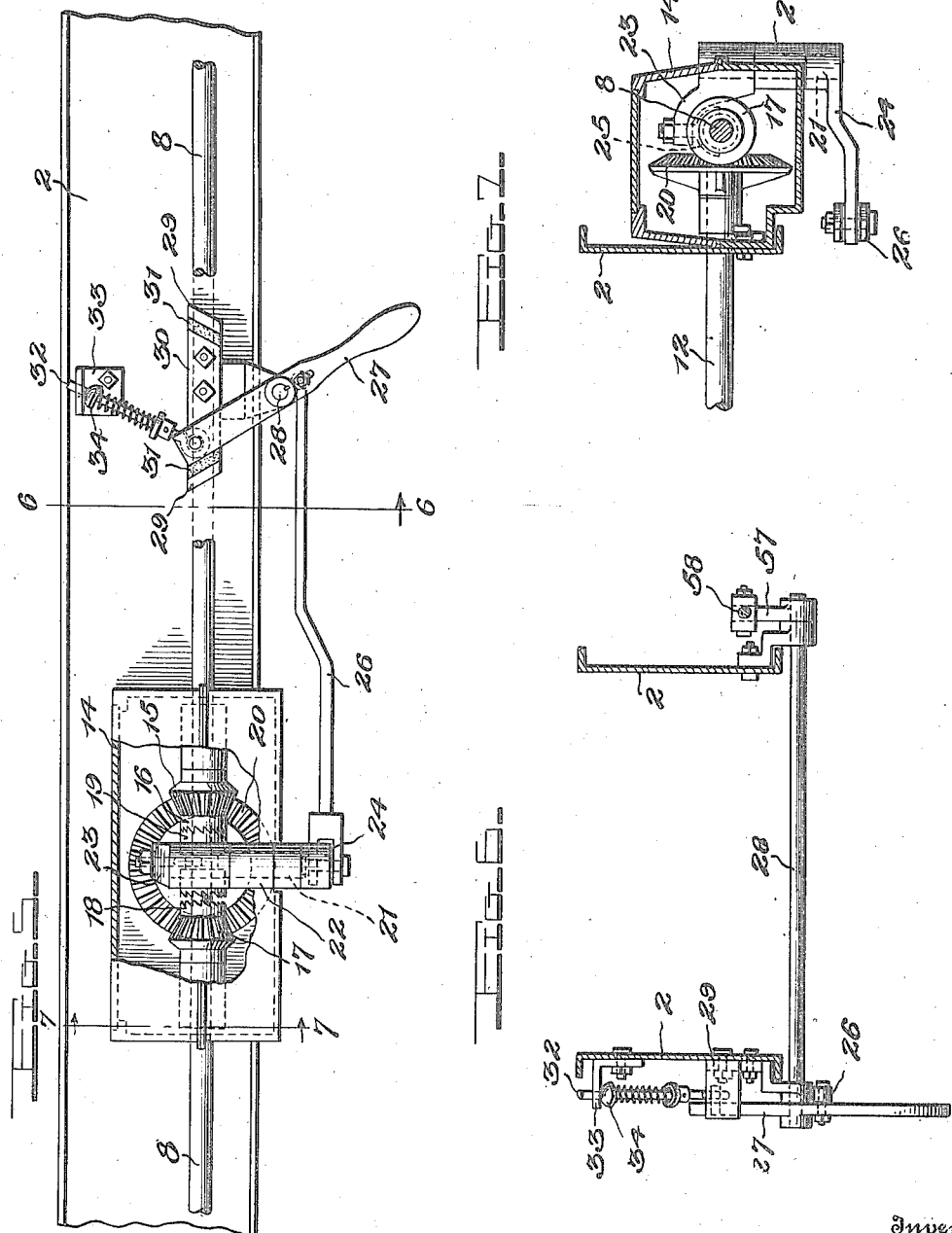

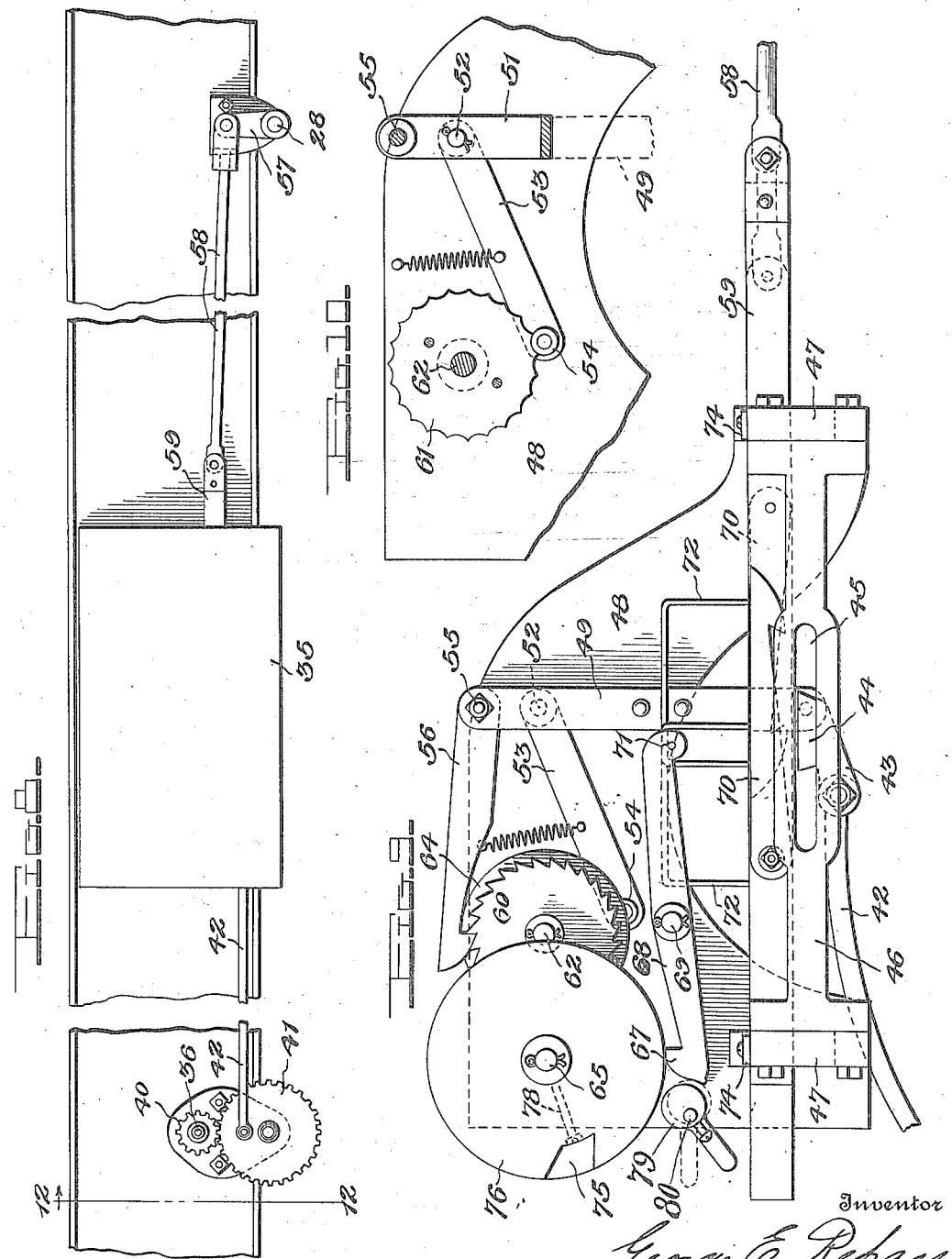

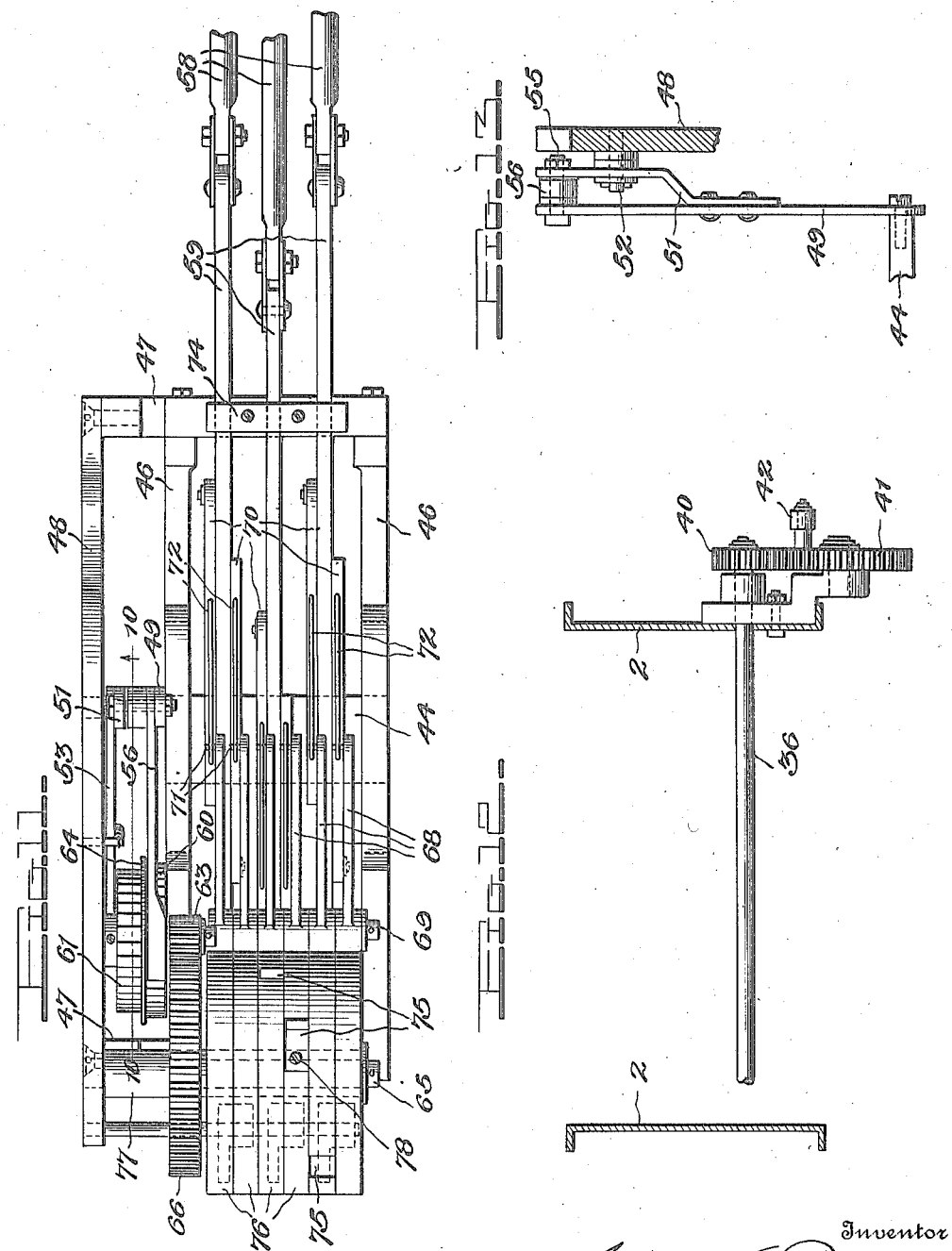

GEORGE E. REPASS, OF KNOXVILLE, TENNESSEE, ASSIGNOR TO H. & B. AMERICAN MACHINE COMPANY, OF PAWTUCKET, RHODE ISLAND, A CORPORATION OF MAINE.

COTTON-DISTRIBUTING APPARATUS.

1,190,800.   Specification of Letters Patent.   Patented July 11, 1916.

Application filed June 26, 1914. Serial No. 347,464.

*To all whom it may concern:*

Be it known that I, GEORGE E. REPASS, a citizen of the United States, residing at Knoxville, in the county of Knox and State of Tennessee, have invented a new and useful Improvement in Cotton-Distributing Apparatus, of which the following is a specification.

The present invention relates to cotton distributing apparatus, and more especially to that type of apparatus in which a conveyer mechanism is employed to deliver the cotton to a plurality or series of feeders arranged in a row beneath the aforesaid mechanism. Its principal object, stated in the broadest terms, is to provide for an apparatus of the character specified an improved feeding attachment which shall be simple in construction, extremely sensitive on action, and easy to adjust, thereby rendering it possible to deliver the desired amount of cotton to each feeder and to so regulate the delivery as to maintain each feeder hopper constantly filled to the desired extent, with the result that a more even lap can be obtained on the pickers, and the cotton can be fed so uniformly and in such small quantities to the hopper that a perfect mixing is assured.

As regards the more detailed features of the apparatus, the invention proposes an improved multi-part conveyer, the component sections of which are reversible both automatically and manually, the latter operation being applicable to any one of such sections at will. The automatic reversing mechanism is so constructed and arranged, moreover, that the times or periods of reversal for any particular section may be either advanced or retarded with respect to those of the preceding or succeeding sections, and that the order in which the reversals take place may likewise be varied, so that a positive and accurate timing in conformity with existing conditions is obtained.

Also, the invention resides in the combination of such a conveyer as above specified, and its selective and automatic reversing mechanism, with a pneumatic conveyer and a condenser, the latter device delivering the cotton to the first-named, or distributing conveyer.

The invention further resides not only in the provision, broadly, of a selective and automatic reversing mechanism in conjunction with a multi-section distributing conveyer, but, also in the particular sub-mechanisms or devices of which such mechanism is composed, and the construction and arrangement of the component parts thereof, whereby the selective and adjustable feature is obtained, as well as in the means, devices and instrumentalities operatively associated therewith.

With the above and other ends in view, the invention contemplates, briefly, an improved apparatus having the general construction, combination and arrangement of parts or equivalents thereof hereinafter described and specifically stated in the appended claims, but, manifestly, all rights of modification and change within the scope of the said claims are reserved.

An apparatus embodying the improved features of the invention is illustrated in the accompanying drawing, whereof—

Figure 1 is a side elevation of the said apparatus complete. Fig. 2 is a plan view of the distributing conveyer. Fig. 3 is a fragmental side elevation on an enlarged scale. Fig. 4 is an end elevation of Fig. 3. Fig. 5 is an enlarged detail view of one of the reversing devices, and its operating means. Fig. 6 is a transverse vertical section, taken on line 6—6 of Fig. 5, and showing the mounting of the manually-operated reversing lever. Fig. 7 is a transverse vertical section taken on line 7—7, Fig. 5, showing the reversing gearing. Fig. 8 is an enlarged fragmental side elevation of the distributing conveyer taken from the opposite side to Fig. 5. Fig. 9 is an enlarged side elevation of the mechanism for timing or controlling the reversing mechanism, and for automatically operating the same. Fig. 10 is a vertical section taken on line 10—10, Fig. 11. Fig. 11 is a plan view of Fig. 9. Fig. 12 is an enlarged transverse vertical section taken on line 12—12, Fig. 8. Fig. 13 is a detail view showing the mounting of the feeding device for the ratchet gear comprehended in the mechanism depicted in Fig. 9. Fig. 14 is an enlarged perspective view of one of the hooks included in the same mechanism. Fig. 15 is a perspective view of one of the end members of the frame arranged for supporting said mechanism, Fig.

16 is a side elevation of one of the driving rods in said mechanism, showing the mounting of the hooks thereon.

Referring to said drawings, and more especially to Figs. 1 to 4 thereof, the improved distributing conveyer 1 is shown as disposed within a skeleton frame 2, the side members of which serve to retain the cotton on said conveyer and are attached from a series of depending elements 3, that are secured, in turn, to the ceiling of the room wherein the apparatus is arranged. The conveyer and its frame are, therefore, supported in elevated position in such room, and directly beneath them are arranged in a row a series of feeders 4 which automatically furnish the cotton supplied to them, as hereinafter described, to the picker machines, the number of these feeders being equal to the number of sections of which the said conveyer is composed. The cotton is transferred to the distributing conveyer from the source of supply by means of a pneumatic conveyer 4' terminating in a condenser 5, both of which elements, as well as the exhauster 6, may be of any suitable form.

As previously stated, this invention involves the use of a distributing conveyer which is made up of a plurality of separate sections, and in the construction illustrated, which may, for all present purposes, be considered as preferred, each of such sections is constituted by an endless belt 7 having its individual driving means. These belts are alined, as will be understood, and the delivery end of each, with the obvious exception of the last or rearmost one, is so arranged as to overhang the receiving end of the succeeding belt, with the result that under normal conditions of operation, the cotton delivered from the condenser to the first belt in order, which lies directly beneath it, will be successively transferred from one belt to the next, until it finally falls from the discharge end of the last belt into the hopper of the feeder therebeneath. On the other hand, when the direction of any one of the belts is reversed, the cotton supplied thereto will be carried backward instead of forward, and will fall into the feeder beneath the receiving end thereof, so that by the simple expedient of reversing the proper belt, the cotton may be supplied to any desired feeder.

The mechanism for driving the several belts which make up the distributing conveyer consists, by preference, of a shaft 8 which extends along one side of the conveyer frame 2 from the front end of said frame, where it is equipped with fast and loose driving pulleys 9, to a point slightly beyond the receiving end of the last belt, as shown in Fig. 1. The opposite ends of each of the said belts pass around pulleys 10 and 11 mounted, respectively, on horizontal shafts 12 and 13, which are disposed transversely of the conveyer frame, the shafts 12 at the receiving ends of the belts passing beyond the adjacent frame side and into housings or cages 14 wherein are arranged their gear connections with the aforesaid driving shaft 8. These gear connections are of such a nature as to permit the desired reversal of the belts, and as shown in Figs. 5 and 7, wherein one of them is represented in detail, each preferably embodies a pair of oppositely beveled pinions 15 and 17 loosely mounted upon shaft 8 in spaced confronting relation to each other and provided with sleeve-like clutch toothed extensions 16 and 18, between which latter is interposed a sliding double clutch member 19 that is keyed to said shaft and is adapted to engage either of the clutch members 16 and 18 to couple the same and its connected pinion to the shaft, for rotation therewith. Both pinions constantly mesh with a larger bevel pinion 20 fixed to the inner end of shaft 12.

In order to effect the shifting of the double clutch member 19 necessary to bring either of the two companion pinions 15 and 17 into action, there may be advantageously provided a vertical rock shaft 21, journaled in a bearing 22 formed on the case or housing 14 and equipped with upper and lower crank arms 23 and 24, the former of which is connected to the aforesaid clutch member by a suitable fork 25 or the like. The lower crank arm 24 has connected to it one end of a rod 26, whose other end is attached to an operating lever 27. This lever, which is keyed intermediate its ends to a horizontal rock shaft 28, journaled transversely to frame 2, may be actuated either manually, at will, or automatically, at predetermined intervals, by the mechanism about to be described. In both instances its movements in opposite directions are limited by means of stops 29, here shown as formed by the obliquely-turned ends of a strap 30 which is bolted to the adjacent side member of the frame, the said ends being faced with suitable cushions or buffers 31. Also, to facilitate such movements, and, hence, the actuation of the lever, the upper end of the latter has pivoted to it one end of a spring-controlled eye-bolt 32, the stem of which projects loosely through an opening in the flanged end of a bracket 33 attached to said frame member and carries a rounded head 34 that is held by the action of the spring against the under face of the flange, as clearly shown in Figs. 5 and 6. In consequence of this arrangement, movement of the crank arm 24 whether effected by the manual operation of the lever 27, by means of its lower or handle portion, or by the actuation of the rock shaft 28 through the agency of the hereinafter-described mechanism, will produce a sliding movement of the sleeve 19, which will, in turn, effect the coupling of one or the other of the pinions 15 and 17 to shaft 8, and the consequent rotation of shaft 12 in one direction or the other.

The afore-mentioned mechanism for automatically effecting the reversal of the several belts 7 is located within a housing 35 at the opposite side of the distributing conveyer from the reversing gearings, and is operated from the shaft 8, preferably through the agency of a cross-shaft 36 (Fig. 2) which is located at the front end of the said conveyer and has a suitable gear connection 37 at one end with shaft 8. The opposite end of shaft 36 carries a gear 40 that meshes with and rotates a gear 41, (Figs. 2, 8 and 12) to which one end of a crank rod 42 is attached, the other end of this rod extending into the housing 35, where it is connected to a pair of lugs 43 secured to the under face of a cross-head 44 (Figs. 9 and 11). The said cross-head is disposed horizontally, as will be understood from the figures specified, and is slidably fitted at its ends in guide grooves 45 provided in a pair of side plates 46, which latter, together with their connecting or end plates 47 (one of which is depicted in Fig. 15), and a supporting plate or bracket 48 (Figs. 9, 10, 11 and 13) are situated within the housing 35, the parts 46 and 47, constituting a frame as is apparent. The rotation of shaft 36 thus serves to impart a reciprocatory movement to rod 42 which is transmitted, in turn, to cross-head 44, the latter moving forward and backward in its guide grooves 45 actuating a rocker bar 49, the lower end of the latter being attached to the adjacent end of the cross-head. The rocker 49 is fulcrumed on bracket 48 through the intermediary of an offset strap 51 which is pivoted centrally on a pin 52 secured to said bracket, the said pin having also pivoted thereon a spring-controlled check-bar 53 carrying a roller 54 at its free end. The upper ends of the rocker and strap are joined by a pin 55, forming a pivot for a pawl 56, designed to actuate a subsequently-described ratchet gear which is utilized, in turn, to actuate the mechanism for controlling the devices employed to operate the reversing gearings.

Reverting to the description of the reversing gearings, and, in connection therewith, to Figs. 2 and 6, it will be recalled that each of the reversing levers 27 is secured to one end of a rocking cross-shaft 28. The opposite end of each rock shaft has affixed to it a crank arm 57, to which is fastened the adjacent end of a connecting rod or pitman 58, connected at the other end thereof to a reciprocatory driving rod 59. The actuation of these driving rods is accomplished by means of the cross-head 44, the latter being operated from the crank rod 42, with which it is connected, as previously stated, but such actuation, however, as well as the direction of the same, is both selective and periodic, being under the complete control of the device or mechanism operated by the above-mentioned ratchet gear. The said gear is here represented as consisting of a ratchet 60 and a notched disk 61 mounted on a short, horizontal shaft 62, on which is also secured a gear 63 (Fig. 11). The said shaft is suitably journaled in bracket 48, and the ratchet and disk thereon are separated by an interposed washer plate 64 to which both are secured, the ratchet, being engaged by the hook or nose of pawl 56, and the disk by the roller 54 on bar 53. The step-by-step rotary movement imparted by the ratchet gear to shaft 62 is transmitted therefrom to a second horizontal shaft 65 by means of the gear 63, the latter meshing with a larger gear 66 on shaft 65.

The shaft just specified carries the above-mentioned device or mechanism for controlling the actuation of the driving rods 59, this device, in its preferred form, consisting of a rotatable body provided with pockets, openings or equivalent apertures or depressions, which, during the rotation of such body are brought, one at a time, opposite the shoulders 67 on the ends of a series of levers 68. The number of these levers is double that of the reversing gearings, and they are fulcrumed intermediate their ends, for individual operation, upon a cross-pin 69, affixed to bracket 48, the other end of each lever being connected with a hook 70 which is pivoted at one end to the adjacent side face of the driving rods. Such connection may be effected in any desired manner, that shown comprising a pin 71 affixed to the lever end and engaged by an upright bail or loop 72 which is secured to the upper edge face of the respective hook, the result being that the weight of the hook causes the shouldered end of the lever to bear upwardly against the surface of the above-mentioned rotatable body until the proper opening or pocket comes opposite said end, whereupon the latter will immediately enter thereinto, due to the weight of the hook 70 suspended from the other end of the lever. At the same time the said hook swings downwardly into the path of the cross-head 44 and engages the same. The cross-head, as previously stated, is continuously reciprocated from or by the shaft 36, through the intermediary of the gears 40 and 41 and crank rod 42, so that when the engagement of a hook with the cross-head takes place, the latter, in moving, will pull the hook, and, consequently, the driving rod with which said hook is connected, with it in the same direction, the movement of the driving rod being imparted to the connecting rod or pitman 59 and thence to the crank-arm 57 of the corresponding reversing gearing. As a result, the said crank arm is rocked in one direction or the other, according to the direction of movement of the cross-head, and it may here be stated that each driving rod is, for this reason, equipped with a pair of hooks 70, which are disposed against the opposite side faces thereof and extend in opposite directions as shown in Fig. 16, so that one of the hooks will operate to pull the driving rod in one direction, and the other hook to pull it in the opposite direction. Consequently, each time that a lever 68 is released, the hook associated with that particular lever will drop and will engage the cross-head, and the latter will actuate the corresponding driving and connecting rods and the reversing gearing, but the said reversing gearing will not be returned until the lever which controls the other hook connected to the aforementioned driving rod has been been released.

The number of driving rods and connecting rods is obviously dependent upon the number of reversing gearings employed, or, in other words, to the number of belts whose movement is to be periodically reversed. In Figs. 1 and 2 the conveyer 1 is shown as composed of six separate belts or sections, all of which, excepting the first, are to be reversed, so that five driving rods, and, consequently, ten hooks and ten levers will be employed. As such a conveyer may, under some circumstances, be unnecessarily long, and as detail illustration of the controlling device therefor would be proportionately complicated and expensive, the number of sections shown in the figures specified may be considered as purely arbitrary. Thus, there may be instances where the conveyer will embody only three reversible sections, in which instance three driving rods will be utilized, as in Fig. 11, this number of driving rods and associated parts being chosen for illustration in order to prevent unnecessary duplication. In any instance, however, the end members 47 of the supporting frame contained within the housing 35 will be formed with guide openings or notches 73 (Fig. 15) for the driving rods, which latter are long enough to project at their opposite ends beyond said members, the tops of such openings or notches being closed by straps 74.

In the construction illustrated, the rotatable pocketed body which directly controls the several levers 68 is in the form of a cylinder mounted upon shaft 65 for rotation therewith, the pockets 75 being situated on the periphery of the cylinder and extending around the same in a somewhat helical manner. Where the cylinder is in the nature of a single block, or the like, the specified arrangement of the pockets, or their equivalents, will admit of actuation of the levers in an unchanging order only, but where the cylinder is made up of a plurality of separate disks which are adjustable relatively to one another, the order in which the levers are actuated may be varied at will, and their times of actuation may be either advanced or retarded. The latter construction is deemed most advantageous and has, in fact, been illustrated in Figs. 9 and 11. As shown therein, the cylinder is composed of counterpart disks 76, one for each lever 68, which are arranged face to face in contact with one another, each disk having a pocket 75 formed therein. The disks are mounted directly upon a sleeve 77 to which they are adjustably secured by screws 78 that pass through openings in the bottoms of the pockets, said openings terminating at the periphery of the said sleeve.

In order to permit any one of the reversing gearings to be thrown out of operation when circumstances are such as to require that course, means is provided in connection with each pair of controlling levers 68 for shifting the same into inoperative position with relation to the corresponding disks 76. The means here shown consists of a series of cam levers 79 (Fig. 9) loosely mounted, for individual operation, upon a cross-rod 80, which is situated beneath the said disks and sufficiently close to the shouldered ends 67 of the controlling levers to enable each cam lever, when moved into its dotted line position, to engage and depress the said shouldered ends of the adjacent pair of controlling levers, so that during the subsequent rotation of the disks the levers thus depressed will be prevented from releasing the hooks associated therewith.

The operation of the entire apparatus is believed to be apparent from the foregoing, so that specific description thereof is deemed unnecessary. It may be stated, however, that the order in which the several belts are reversed is dependent upon the relative arrangement of the pockets in the rotatable cylinder or other controlling body, and that such order may be varied at will within certain limits by changing the relative positions of the disks or other component members of the said body wherein the pockets are provided. Also, as further regards the pockets, it will be apparent that their provision in the aforesaid members enables the latter to have a somewhat cam-like action upon the controlling levers, irrespective of the particular forms which the members and pockets themselves may take.

Having thus described my invention, I claim as new and desire to secure by Letters Patent:—

1. In a cotton distributing apparatus, the combination of a conveyer comprising a plurality of independently movable sections, driving means therefor, selective means for automatically reversing the direction of movement of said sections, and means for reversing the direction of movement of an individual section independent of the selective means.

2. In cotton distributing apparatus, the combination of a conveyer comprising a plurality of independently movable sections, driving means therefor, and selective means for automatically reversing the direction of movement of said sections.

3. In cotton distributing apparatus, the combination of a conveyer comprising a plurality of independently movable sections, driving means therefor, and means for automatically reversing the direction of movement of said sections in any predetermined order.

4. In cotton distributing apparatus, the combination of a conveyer comprising a plurality of independently movable sections, driving means therefor, and selective means for automatically reversing the direction of movement of said sections embodying a plurality of members corresponding in number to the number of sections and differentially movable relative to one another.

5. In cotton-distributing apparatus, the combination of a conveyer comprising a plurality of independently movable sections, driving means therefor, and selective means for automatically reversing the direction of movement of said sections embodying a plurality of differentially-movable members.

6. In cotton distributing apparatus, the combination of a conveyer comprising a plurality of independently movable sections, driving means therefor, means for reversing the movement of said sections, and a controller for said reversing means embodying a rotatable element provided with a series of openings, and a series of levers arranged for engagement in predetermined order in said openings and operatively associated with the said reversing means.

7. In cotton distributing apparatus, the combination of a conveyer comprising a plurality of independently movable sections, driving means therefor, means for reversing the movement of said sections, and a controller for said reversing means embodying a movable element provided with a series of openings, and a series of levers arranged for engagement in predetermined order in said openings and operatively associated with the said reversing means.

8. In a cotton distributing apparatus, the combination of a conveyer comprising a plurality of independently movable sections, driving means therefor, means for reversing the movement of said sections, and a controller for said reversing means embodying a rotatable cylindrical element provided with a series of openings, and a series of levers arranged for engagement in predetermined order in said openings and operatively associated with the said reversing means.

9. In cotton distributing apparatus, the combination of a conveyer comprising a plurality of independently movable sections, driving means therefor, means for reversing the movement of said sections, and a controller for said reversing means embodying a movable element consisting of a series of juxtaposed members each having an opening, and a series of levers arranged for engagement in predetermined order in said openings and operatively associated with the said reversing means.

10. In cotton distributing apparatus, the combination of a conveyer comprising a plurality of independently movable sections, driving means therefor, means for reversing the movement of said sections, and a controller for said reversing means embodying a rotatable element consisting of a series of juxtaposed members each having an opening, and a series of levers arranged for engagement in predetermined order in said openings and operatively associated with the said reversing means.

11. In cotton distributing apparatus, the combination of a conveyer comprising a plurality of independently movable sections, driving means therefor, means for reversing the movement of said sections, and a controller for said reversing means embodying a movable element consisting of a series of juxtaposed members connected together for movement in unison and having, each, an opening, and a series of levers arranged for engagement in predetermined order in said openings and operatively associated with the said reversing means, said members being adjustable relatively to one another to vary the order of such engagement.

12. In cotton distributing apparatus, the combination of a conveyer comprising a plurality of independently movable sections, driving means therefor, means for reversing the movement of said sections, and a controller for said reversing means embodying a rotatable element consisting of a series of juxtaposed disks connected together for movement in unison and having, each, an opening, and a series of levers arranged for engagement in predetermined order in said openings and operatively associated with the said reversing means, said disks being adjustable relatively to one another to vary the order of such engagement.

13. In cotton distributing apparatus, the combination of a conveyer comprising a plurality of independently movable sections, driving means therefor, means for reversing the movement of said sections, and a controller for said reversing means embodying a series of juxtaposed cams, and a series of levers arranged for engagement in predetermined order with said cams and operatively associated with the said reversing means.

14. In cotton distributing apparatus, the combination of a conveyer comprising a plurality of independently movable sections, driving means therefor, means for reversing the movement of said sections, and a controller for said reversing means embodying a series of juxtaposed cams, and a series of levers arranged for engagement in predetermined order with said cams and operatively associated with the said reversing means, said cams being adjustable relatively to one another to vary the order of such engagement.

15. In cotton distributing apparatus, the combination of a conveyer comprising a plurality of independently movable sections, driving means therefor, means for reversing the movement of said sections, and a controller for said reversing means embodying a rotatable element and a series of levers coöperative therewith and operatively associated with the said reversing means, said element being provided with means adapted for engagement by said levers in predetermined order.

16. In cotton distributing apparatus, the combination of a conveyer comprising a plurality of independently movable sections, driving means therefor, means for reversing the movement of said sections, and a controller for said reversing means embodying a rotatable element consisting of a series of juxtaposed members, and a series of levers coöperative with said members and operatively associated with the same reversing means, each of said members being provided with means adapted for engagement by the adjacent lever.

17. In cotton distributing apparatus, the combination of a conveyer comprising a plurality of independently movable sections, driving means therefor, means for reversing the movement of said sections, and a controller for said reversing means embodying a rotatable element consisting of a series of juxtaposed members, adjustable relatively with said members and operatively associated with the said reversing means, each of said members being provided with means adapted for engagement by the adjacent lever.

In testimony whereof I have signed my name to this specification in the presence of two subscribing witnesses:

GEORGE E. REPASS.

Witnesses:
    L. H. BROWN,
    H. G. COE.